(12) United States Patent
Krajenke et al.

(10) Patent No.: US 8,844,910 B2
(45) Date of Patent: Sep. 30, 2014

(54) GAS STRUT ASSEMBLY WITH AN INTERNAL DETENT MODULE

(75) Inventors: Gary W Krajenke, Warren, MI (US); Alvin N Standard, Clarkston, MI (US); Babu R Amarnath, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 131 days.

(21) Appl. No.: 13/473,899

(22) Filed: May 17, 2012

(65) Prior Publication Data

US 2013/0307203 A1 Nov. 21, 2013

(51) Int. Cl.
*F16F 5/00* (2006.01)

(52) U.S. Cl.
USPC ............... 267/64.12; 267/64.11; 267/120; 267/124

(58) Field of Classification Search
USPC ............... 188/265, 322.19, 381
See application file for complete search history.

(56) References Cited

U.S. PATENT DOCUMENTS

| | | | | |
|---|---|---|---|---|
| 3,883,126 A * | 5/1975 | Nicholls | | 267/64.12 |
| 5,174,551 A * | 12/1992 | Mintgen | | 267/120 |
| 5,358,225 A * | 10/1994 | Volpel et al. | | 267/64.12 |
| 5,606,879 A * | 3/1997 | Froelicher et al. | | 68/23.3 |
| 6,634,627 B1 * | 10/2003 | Stevenson | | 267/64.12 |
| 7,891,643 B2 * | 2/2011 | Rana et al. | | 267/64.12 |
| 8,080,321 B2 * | 12/2011 | Sakakibara | | 428/632 |
| 8,246,019 B2 * | 8/2012 | Krajenke | | 267/64.23 |
| 8,522,934 B2 * | 9/2013 | Born | | 188/300 |
| 2008/0315475 A1 * | 12/2008 | Krajenke | | 267/292 |
| 2009/0155618 A1 * | 6/2009 | Sakakibara | | 428/628 |
| 2009/0236781 A1 * | 9/2009 | Born | | 267/64.12 |

* cited by examiner

*Primary Examiner* — Thomas Irvin
(74) *Attorney, Agent, or Firm* — Quinn Law Group, PLLC

(57) ABSTRACT

A gas strut assembly includes a housing defining an interior space. A rod is coupled to the housing, and is slideably moveable between an extended position and a retracted position. A flexible member is secured in position relative to the housing. A rigid member is coupled to and moveable with the rod. The flexible member includes at least one displaceable member that moves radially away from the central axis in response to a second radial force component of a closing force when engaged by the rigid member moving from the extended position into the retracted position. The flexible member includes a multi-layered structure that changes shape in response to a change in temperature to affect the magnitude of the second radial force component required to move the displaceable member.

19 Claims, 4 Drawing Sheets

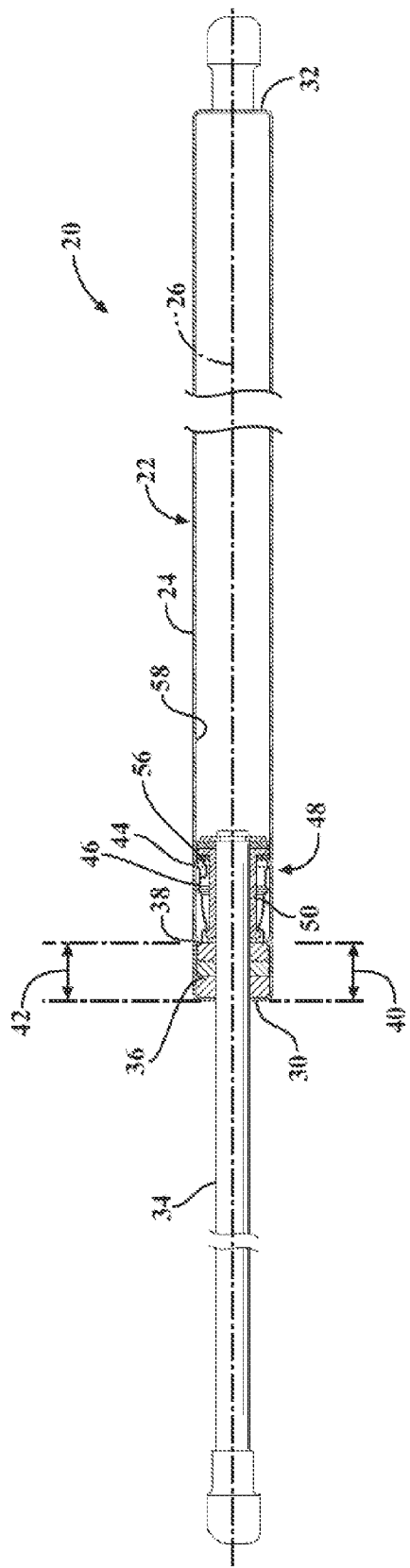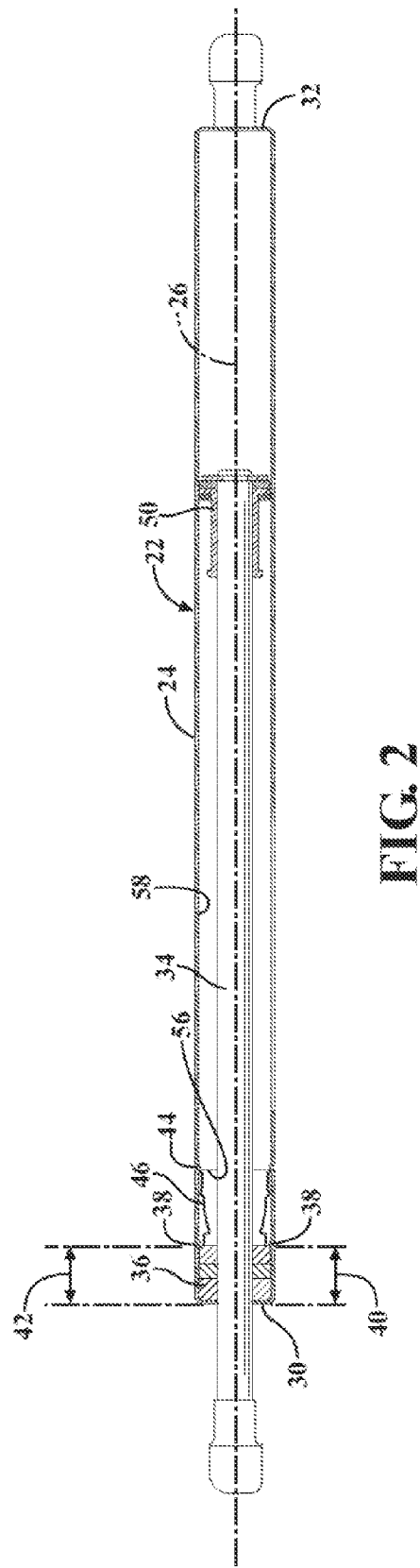
FIG. 1
FIG. 2

GAS STRUT ASSEMBLY WITH AN INTERNAL DETENT MODULE

TECHNICAL FIELD

The invention generally relates to a gas strut assembly, and more specifically to an internal detent module for increasing a hold-open force of the gas strut assembly.

BACKGROUND

Gas strut assemblies include a housing that defines an interior space, with a rod moveably disposed within the interior space. The rod is slideably moveable along a central axis between a retracted position, i.e., a shortened position, and an extended position, i.e., a lengthened position. A piston is disposed at an axial end of the rod within the interior space of the housing. The housing includes a closed end, and includes a volume of gas, such as but not limited to air, trapped within the interior space of the housing, between the piston and the closed end of the housing. Movement of the rod from the extended position into the retracted position compresses the air between the closed end of the housing and the piston, thereby generating a resulting axial force urging the piston and the rod back into the extended position. As such, the rod is continuously biased into the extended position.

Because the gas strut assemblies are biased toward the extended position, the gas strut assemblies are often utilized to provide an opening force and/or to provide a hold-open force to door, trunk lid, hood, etc. However, the gas strut assemblies rely on the compressed gas to provide the axial force urging the piston and the rod into the extended position. Changing ambient temperatures changes the temperature of the gas, which changes the density of the gas. For example, when the temperature decreases, the density of gas also decreases, which lowers the resulting axial force that urges the rod into the extended position.

SUMMARY

A gas strut assembly is provided. The gas strut assembly includes a housing having a wall that extends along a central axis. The wall defines an interior space. A rod is coupled to the housing. The rod is slideably moveable within the interior space along the central axis between an extended position and a retracted position. A flexible member is secured in position relative to the housing. A rigid member is coupled to and moveable with the rod. The flexible member includes at least one displaceable member that moves radially away from the central axis in response to a radial force component of a closing force when engaged by the rigid member moving from the extended position into the retracted position. The flexible member includes a first material forming a first layer, and a second material forming a second layer bonded to the first layer. The first layer and the second layer are bonded together to form a multi-layered structure.

Accordingly, the interaction between the rigid member and the flexible member resists movement of the rod along the central axis. In order to move the rod from the extended position into the retracted position, the interaction between the flexible member and the rigid member must generate the radial force component from the closing force. The radial force component must be sufficient to move the displaceable member away from the rigid member to allow the rigid member to pass thereby and continue into the retracted position. As such, the mechanical interaction between the rigid member and the flexible member increases the force required to move the rod out of the extended position and into the retracted position, thereby increasing the hold-open force of the gas strut assembly.

The behavior of the multi-layered structure of the flexible member in varying temperatures causes the displaceable member to change shape and/or position, which changes the interaction between the rigid member and the displaceable member. The changed interaction between the rigid member and the displaceable member changes the amount of force required to move the displaceable member radially away from the rigid member to allow the rigid member to pass thereby. Accordingly, the multi-layered structure of the flexible member causes the required closing force to change with varying temperatures.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic cross sectional view of a gas strut assembly in an retracted position.

FIG. 2 is a schematic cross sectional view of the gas strut assembly in an extended position.

DETAILED DESCRIPTION

Figure 3:
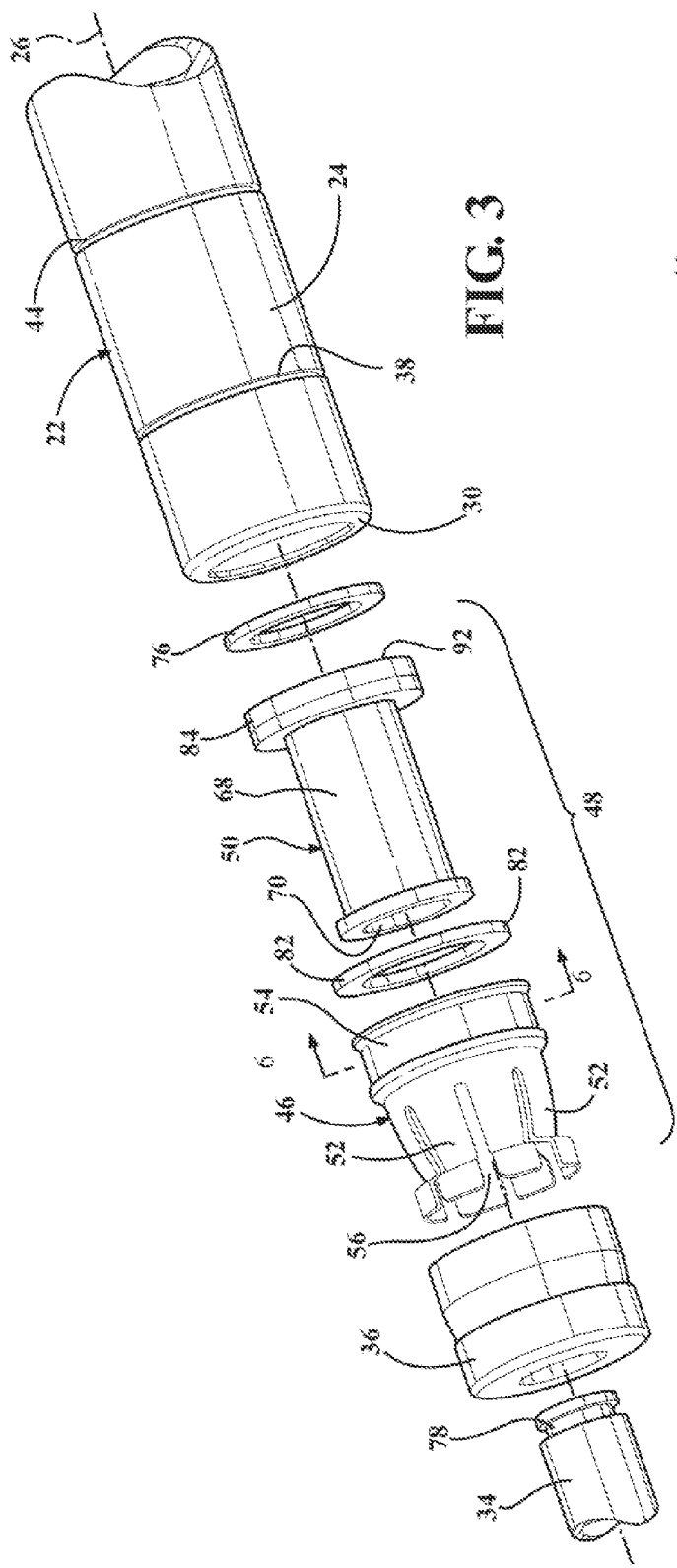
FIG. 3 is an exploded schematic perspective view of the gas strut assembly.

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a gas strut assembly is generally shown at 20. Referring to FIGS. 1 and 2, the gas strut assembly 20 includes a housing 22. The housing 22 includes an exterior wall 24 that extends along a central axis 26. The exterior wall 24 includes a circular cross sectional shape perpendicular to the central axis 26, and defines an interior space 28, also having a circular cross sectional shape perpendicular to the central axis 26.

The housing 22 includes a first open end 30 and a second closed end 32. A rod 34 is coupled to the housing 22, and extends through the open end of the housing 22. The rod 34 extends along the central axis 26, and is concentric with the housing 22 about the central axis 26. The rod 34 is slideably moveable within the interior space 28 of the housing 22 along the central axis 26. The rod 34 moves between a retracted or shortened position, shown in FIG. 1, and an extended or lengthened position, shown in FIG. 2.

A sealing pack 36 is attached to the housing 22, adjacent to the first open end 30 of the housing 22. The sealing pack 36 seals between the rod 34 and the housing 22 to trap gas, such as but not limited to air, within the interior space 28 of the housing 22. The sealing pack 36 slideably supports the rod 34 relative to the housing 22.

The first open end 30 of the housing 22 is flared radially inward toward the central axis 26. The housing 22 includes a first rim 38 that extends radially inward toward the central axis 26. The first rim 38 is spaced from the flared open end of the housing 22 an axial distance 40 along the central axis 26 equal to a length 42 of the sealing pack 36 measured along the central axis 26. The sealing pack 36 is disposed between the first rim 38 and the flared open end of the housing 22, and is secured in position relative to the housing 22 by the flared first open end 30 of the housing 22 and the first rim 38.

The housing 22 further includes a second rim 44 spaced along the central axis 26 from the first rim 38. A flexible member 46 of an internal detent module 48 (described in greater detail below) is disposed between the sealing pack 36 and the second rim 44. As such, the flexible member 46 of the internal detent module 48 is secured in position relative to the housing 22 by the sealing pack 36 and the second rim 44.

The internal detent module 48 interconnects the housing 22 and the rod 34 when the rod 34 is disposed in the extended position to increase a closing force of the gas strut assembly 20. The closing force is the force required to move the rod 34 from the extended position into the retracted position. Accordingly, the internal detent module 48 increases the force required to move the rod 34 from the extended position into the retracted position.

Referring also to FIG. 3, the internal detent module 48 includes the flexible member 46 and a rigid member 50. As described above, the flexible member 46 is secured in position relative to the housing 22. The rigid member 50 is attached to and moveable with the rod 34. The flexible member 46 includes at least one displaceable member 52. As shown, the at least one displaceable member 52 includes a plurality of displaceable members 52 radially spaced about the central axis 26. FIG. 3 shows eight displaceable members 52 in the exemplary embodiment. However, it should be appreciated that the total number of displaceable members 52 may vary from the eight shown in the exemplary embodiment. While only one of the displaceable members 52 is described in detail herein, each of the displaceable members 52 is identical. As such, the description of the displaceable member 52 described below is applicable to all of the displaceable members 52.

The flexible member 46 includes an annular base 54 defining a central aperture 56. The rod 34 extends through the central aperture 56 of the annular base 54. The outer periphery of the annular base 54 extends radially outward into abutting engagement with an interior surface 58 of the exterior wall 24 of the housing 22. The flexible member 46 includes a slot 110 extending a length of the flexible member 46 along the central axis 26, such that the cross sectional shape of the flexible member 46 perpendicular to the central axis 26 defines an open semi-circular shape. The open semi-circular cross sectional shape of the flexible member 46 allows the flexible member 46 to expand radially within the interior space 28 of the housing 22, without binding. The displaceable member 52 extends axially along the central axis 26 from the annular base 54, with the displaceable member 52 disposed between the annular base 54 and the sealing pack 36. The displaceable member 52 includes a first leg portion 60 extending substantially along the central axis 26, a wall portion 62 extending from the first leg portion 60 and substantially away from the central axis 26, and a second leg portion 66 extending from the wall portion 62 and substantially along the central axis 26.

The rigid member 50 includes a body 68 that defines a central bore 70. The body 68 is disposed about and concentric with the rod 34 such that the rod 34 passes through the central bore 70. As shown, the rod 34 includes a ridge 72 that engages the body 68 of the rigid member 50 and prevents the rigid member 50 from moving axially along the rod 34 in a first axial direction 74 beyond the ridge 72. A clip 76 is coupled to a recess 78 in the rod 34 to prevent movement of the rigid member 50 relative to the rod 34 in a second axial direction 80, i.e., opposite the first axial direction 74. As such, the rigid member 50 is secured in place on the rod 34 between the ridge 72 and the clip 76. The internal detent module 48 may further include a first washer 82 and a second washer 84 disposed at opposite axial ends of the rigid member 50. The body 68 includes detent 86, which extends radially away from the body 68 and the central axis 26. The detent 86 is disposed at an axial end of the body 68 facing the first open end 30 of the housing 22. As shown, the detent 86 includes an annular ring that extends away from the body 68 of the rigid member 50, and completely encircles the rod 34. However, it should be appreciated that the detent 86 need not completely encircle the rod 34, and that the detent 86 may include multiple detents, with each of the detents spaced about the body 68 of the rigid member 50.

The detent 86 includes a first cam surface 88 and a second cam surface 90. As shown, the first cam surface 88 and the second cam surface 90 are defined by rounded or chamfered axial edges of the detent 86. The first cam surface 88 is defined by an axial edge of the detent 86 facing the first open end 30 of the housing 22. The second cam surface 90 is defined by an axial edge of the detent 86 facing the second closed end 32 of the housing 22.

Figure 4:
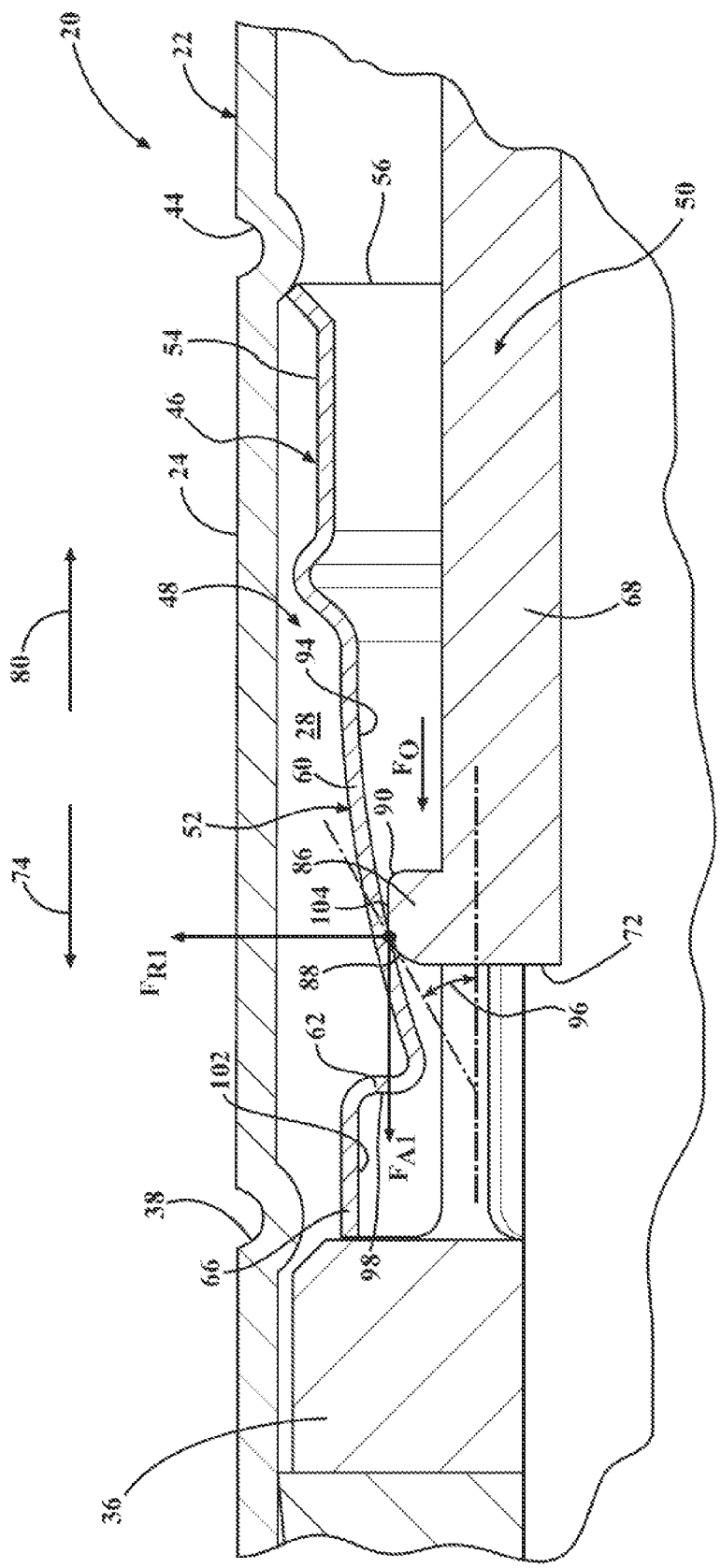
FIG. 4 is an enlarged schematic cross sectional view of a detent module of the gas strut assembly showing a resultant force diagram of an opening force of the gas strut assembly generating a first radial force component.

Referring to FIG. 4, the first cam surface 88 engages the displaceable member 52 when moving from the retracted position into the extended position. The displaceable member 52 moves radially away from the central axis 26 in response to a first radial force component $F_{R1}$ of an opening force $F_O$ when engaged by the first cam surface 88 of the rigid member 50. The opening force $F_O$ is a force applied to the rod 34 to move the rod 34 from the retracted position into the extended position. The opening force $F_O$ is applied by compressed gas, such as but not limited to air, trapped between a piston end 92 of the rigid member 50 and the second closed end 32 of the housing 22. The compressed gas biases against the piston end 92 of the rigid member 50 to urge the rod 34 from the refracted position into the extended position, thereby providing the opening force $F_O$.

The first leg portion 60 of the displaceable member 52 includes a radially inner surface 102 that contacts and/or engages the first cam surface 88 of the detent 86. The radial inner surface 94 of the first leg portion 60 is angled relative to the central axis 26. The first cam surface 88 engages the radial inner surface 94 of the first leg portion 60 to define a first engagement angle 96 there between. When the opening force $F_O$ is applied to the rod 34, the engagement or interaction between the first cam surface 88 and the radial inner surface 94 of the first leg portion 60 at the first engagement angle 96 relative to the central axis 26 generates a first axial force component $F_{A1}$ and the first radial force component $F_{R1}$. The first axial force component $F_{A1}$ is directed along or parallel with the central axis 26, and the first radial force component $F_{R1}$ is directed perpendicularly away from the central axis 26, and against the displaceable member 52. The degree of angle of the first engagement angle 96 relative to the central axis 26 determines how much of the opening force $F_O$ is directed into the first axial force component $F_{A1}$ and the first radial force component $F_{R1}$ respectively. A greater value of the first engagement angle 96 directs more of the opening force $F_O$ into the first axial force component $F_{A1}$ than a lesser value of the first engagement angle 96, thereby decreasing the first radial force component $F_{R1}$ and requiring a greater opening force $F_O$ to move the displaceable member 52 radially away from the detent 86 and allowing the rigid member to move into the extended position. The radial inner surface 94 of the first leg portion 60 is preferably oriented relative to the central axis 26 so that the first engagement angle 96 includes a smaller or lesser value so as not to greatly increase the required opening force $F_O$. For example, the first engagement angle 96 may vary between the range of 0° and 45°. However, it should be appreciated that the first engagement angle 96 may differ from the values described herein, and may be defined based upon the particular uses of the gas strut assembly 20.

Figure 5:
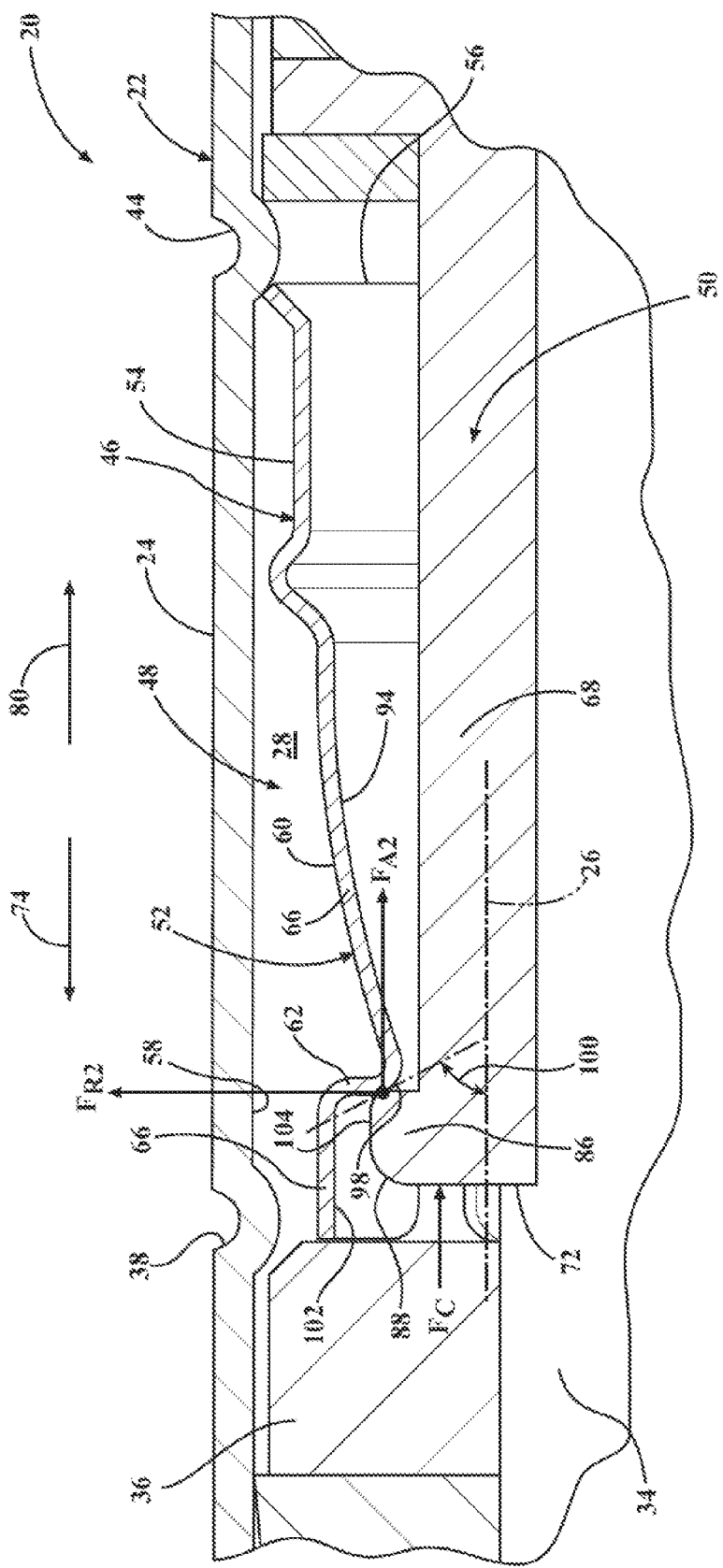
FIG. 5 is an enlarged schematic cross sectional view of the detent module showing a resultant force diagram of a closing force of the gas strut assembly generating a second radial force component.

Referring to FIG. 5, the second cam surface 90 engages the displaceable member 52 when moving from the extended position into the retracted position. The displaceable member 52 moves radially away from the central axis 26 in response to a second radial force component $F_{R2}$ of the closing force $F_C$ when engaged by the second cam surface 90 of the rigid member 50.

The wall portion 62 of the displaceable member 52 extends from an axial end of the first leg portion 60 and radially away from the central axis 26. The wall portion 62 includes an axial end surface 98 that engages and/or contacts the second cam surface 90 of the detent 86. The axial end surface 98 of the wall portion 62 is angled relative to the central axis 26. The second cam surface 90 engages the axial end surface 98 of the wall portion 62 to define a second engagement angle 100 there between. When the closing force $F_C$ is applied to the rod 34, the engagement between the second cam surface 90 and the axial end surface 98 of the wall portion 62 at the second engagement angle 100 relative to the central axis 26 generates a second axial force component $F_{A2}$ and the second radial force component $F_{R2}$. The second axial force component $F_{A2}$ is directed along or parallel with the central axis 26, and the second radial force component $F_{R2}$ is directed perpendicularly away from the central axis 26, and against the displaceable member 52. The degree of angle of the second engagement angle 100 relative to the central axis 26 determines how much of the closing force $F_C$ is directed into the second axial force component $F_{A2}$ and the second radial force component $F_{R2}$ respectively. A greater value of the second engagement angle 100 directs more of the closing force $F_C$ into the second radial force component $F_{R2}$ than a lesser value of the second engagement angle 100, thereby requiring a greater closing force $F_C$ to move the displaceable member 52 radially away from the detent 86 and allowing the rigid member to move into the retracted position. The axial end surface 98 of the wall portion 62 is preferably oriented relative to the central axis 26 so that the second engagement angle 100 includes a higher or greater value so as to significantly increase the required closing force $F_C$. For example, the second engagement angle 100 may vary between the range of 0° and 45°. However, it should be appreciated that the second engagement angle 100 may differ from the values described herein, and may be defined based upon the particular uses of the gas strut assembly 20. When the second engagement angle 100 is defined to include a higher value than the first engagement angle 96, it should be appreciated that the second radial force component $F_{R2}$ is greater than the first radial force component $F_{R1}$.

The second leg portion 66 of the displaceable member 52 extends from the wall portion 62, axially along the central axis 26 and away from the first leg portion 60. The second leg portion 66 includes a radial inner surface 102 that contacts and/or engages a radial outer surface 104 of the detent 86. Engagement between the radial outer surface 104 of the detent 86 and the radial inner surface 102 of the second leg portion 66 limits radial movement of the displaceable member 52 inward toward the central axis 26 when the rod 34 is in the extended position. As such, when the rod 34 is in the extended position, the engagement between the radial outer surface 104 of the detent 86 and the radial inner surface 102 of the second leg portion 66 ensures proper engagement between the second cam surface 90 and the axial end surface 98 of the wall portion 62, and prevents the displaceable member 52 from flexing radially inward toward the body 68 of the rigid member 50 and becoming wedged in place.

Figure 6:
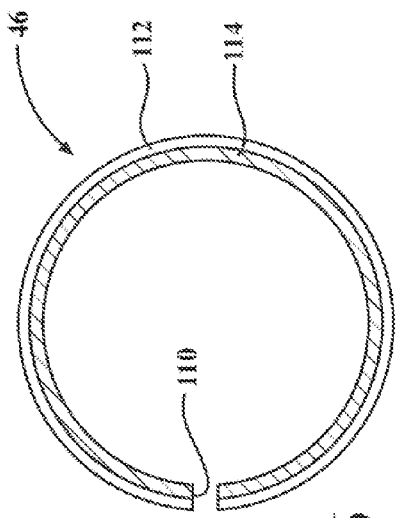
FIG. 6 is a schematic cross sectional view of a flexible member of the internal detent module.

Referring to FIG. 6, the flexible member 46 includes a multi-layered structure including at least a first material and a second material. The first material forms a first layer 112, and the second material forms a second layer 114. The first layer 112 is bonded to the second layer 114 to form the multi-layered structure. While the exemplary embodiment of the multi-layered structure of the flexible member 46 is shown as including only two layers, it should be appreciated that the multi-layered structure may include more than two layers.

The first material includes a first coefficient of thermal expansion, and the second material includes a second coefficient of thermal expansion. The second coefficient of thermal expansion is different from the first coefficient of thermal expansion such that a thermal change in the multi-layered structure of the flexible member 46, i.e., a temperature change in the flexible member 46, causes the first layer 112 and the second layer 114 to expand and/or contract at different rates. When the first layer 112 and the second layer 114 expand and/or contract at different rates in response to the thermal change in the flexible member 46, a shape of the flexible member 46, and more specifically a shape of the displaceable member 52 changes.

The change in shape of the displaceable member 52 in response to the thermal change of the flexible member 46 changes a point of contact between the first cam surface 88 and the displaceable member 52 when the rod 34 is moving from the retracted position into the extended position, and also changes a point of contact between the second cam surface 90 and the displaceable member 52 when the rod 34 is moving from the extended position into the retracted position. By moving the point of contact between the first and/or second cam surfaces 88, 90 and the displaceable member 52, the thermal change of the flexible member 46 may change at least one of the first engagement angle 96 and the second engagement angle 100. A described above, a change in the first engagement angle 96 changes the amount of the opening force $F_O$ that is directed into the first radial force component $F_{R1}$, thereby affecting the magnitude of the opening force $F_O$ required to move the rod 34 from the retracted position into the extended position. Similarly, a change in the second engagement angle 100 changes the amount of the closing force $F_C$ that is directed into the second radial force component $F_{R2}$, thereby affecting the magnitude of the closing force $F_C$ required to move the rod 34 from the extended position into the retracted position.

For example, if the first layer 112, i.e., the outer layer, expands less than the second layer 114, i.e., the inner layer, for a given temperature change, then the displaceable member 52 may flex or bend radially outward, away from the central axis, which moves the point of contact between the displaceable member 52 and the first cam surface 88 and/or second cam surface 90, which reduces the radial force component required to move the displaceable member 52 radially away from the detent 86. Alternatively, if the first layer 112 expands more than the second layer 114 for a given temperature change, such as a decrease in temperature, then the displaceable member 52 may flex or bend radially inward, toward the central axis, which moves the point of contact between the displaceable member 52 and the first cam surface 88 and/or second cam surface 90, which increases the radial force component required to move the displaceable member 52 radially away from the detent 86. As such, the hold-open force may be increased for decreasing temperatures.

The material characteristics of the first material and the second material of the flexible member 46, particularly the stiffness or resistance to bending of the material and the coefficient of thermal expansion, affects the force required to move the displaceable member 52 radially away from the rigid body 68. As such, the specific material chosen for the first material and/or the second material is dependent upon the particular use for the strut assembly. The first material and the second material each include a composition having different coefficients of thermal expansion/contraction. For example, the first material may include a first spring steel metal alloy composition having a first coefficient of thermal expansion, and the second material may include a second spring steel alloy composition having a second coefficient of thermal expansion, with the second coefficient of thermal expansion different from the first coefficient of thermal expansion. It should be appreciated that the first material and the second material may include materials other than spring steel. As noted above, the first material is different from the second material. Both the first material and the second material may include a metal. Alternatively, only one of the first material and the second material may include a metal, with the other including a non-metal material.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A gas strut assembly comprising:
a housing including a wall extending along a central axis and defining an interior space;
a rod coupled to the housing and slideably moveable within the interior space and along the central axis between an extended position and a retracted position;
a flexible member completely disposed within the interior space of the housing and secured in position relative to the housing; and
a rigid member coupled to and moveable with the rod;
wherein the flexible member includes a slot extending a length of the flexible member along the central axis;
wherein the flexible member includes at least one displaceable member configured for moving radially away from the central axis in response to a radial force component of a closing force when engaged by the rigid member moving from the extended position into the refracted position; and
wherein the flexible member includes a first material forming a first layer and a second material forming a second layer bonded to the first layer to form a multi-layered structure.

2. A gas strut assembly as set forth in claim 1 wherein the first material includes a first coefficient of thermal expansion, and the second material includes a second coefficient of thermal expansion, wherein the second coefficient of thermal expansion is different from the first coefficient of thermal expansion such that a thermal change in the multi-layered structure of the flexible member causes the first layer and the second layer to expand or contract at different rates causing a shape of the at least one displaceable member to change in response to the thermal change in the flexible member.

3. A gas strut assembly as set forth in claim 2 wherein both the first material and the second material include metals.

4. A gas strut assembly as set forth in claim 1 wherein the flexible member includes a cross sectional shape perpendicular to the central axis that defines an open semi-circular shape.

5. A gas strut assembly as set forth in claim 1 wherein the rigid member includes a body disposed about and concentric with the rod, and a detent extending radially away from the body and the central axis, wherein the detent includes a first cam surface for engaging the displaceable member when moving from the refracted position into the extended position, and wherein the detent includes a second cam surface for engaging the displaceable member when moving from the extended position into the retracted position.

6. A gas strut assembly as set forth in claim 5 wherein the change in shape of the displaceable member in response to the thermal change of the flexible member changes a point of contact between the first cam surface and the displaceable member, and changes a point of contact between the second cam surface and the displaceable member.

7. A gas strut assembly as set forth in claim 5 wherein the flexible member includes an annular base, with the displaceable member extending axially along the central axis from the annular base.

8. A gas strut assembly as set forth in claim 7 wherein the displaceable member includes a first leg portion having a radially inner surface for engaging the first cam surface of the detent.

9. A gas strut assembly as set forth in claim 8 wherein the radial inner surface of the first leg portion is angled relative to the central axis, wherein the first cam surface engages the radial inner surface of the first leg portion at a first engagement angle relative to the central axis such that a force applied axially to the rod along the central axis generates a radial component force thereof directed perpendicularly away from the central axis.

10. A gas strut assembly as set forth in claim 9 wherein the first engagement angle is between the range of 0° and 45°.

11. A gas strut assembly as set forth in claim 9 wherein the displaceable member includes a wall portion extending from an axial end of the first leg portion and radially away from the central axis, wherein the wall portion includes an axial end surface for engaging the second cam surface of the detent.

12. A gas strut assembly as set forth in claim 11 wherein the axial end surface of the wall portion is angled relative to the central axis, wherein the second cam surface engages the axial end surface of the wall portion at a second engagement angle relative to the central axis such that a force applied axially to the rod along the central axis generates a radial component force thereof directed perpendicularly away from the central axis.

13. A gas strut assembly as set forth in claim 12 wherein the second engagement angle is between the range of 0° and 45°.

14. A gas strut assembly as set forth in claim 12 wherein the change in shape of the displaceable member in response to the thermal change of the flexible member changes at least one of the first engagement angle and the second engagement angle.

15. A gas strut assembly comprising:
a housing including a wall extending along a central axis and defining an interior space;

a rod coupled to the housing and slideably moveable within the interior space and along the central axis between an extended position and a refracted position; and an internal detent module interconnecting the housing and the rod, the internal detent module including:

a rigid member coupled to and moveable with the rod, and including a body having a detent extending radially away from the body and the central axis, wherein the detent defines a first cam surface and a second cam surface;

a flexible member completely disposed within the interior space of the housing and secured in position relative to the housing, and including a plurality of displaceable members, with each of the displaceable members including a first leg portion having a radially inner surface, and a wall portion having an axial end surface;

wherein the flexible member includes a slot extending a length of the flexible member along the central axis such that a cross sectional shape of the flexible member perpendicular to the central axis defines an open semi-circular shape;

wherein the radial inner surfaces of the first leg portions of the displaceable members are angled relative to the central axis to engage the first cam surface of the detent at a first engagement angle relative to the central axis when moving from the retracted position into the extended position, such that the first engagement angle directs a portion of an opening force applied axially to the rod along the central axis perpendicularly away from the central axis to define a first radial force component of the opening force;

wherein the axial end surfaces of the wall portions are angled relative to the central axis to engage the second cam surface of the detent at a second engagement angle relative to the central axis when moving from the extended position into the retracted position, such that the second engagement angle directs a portion of a closing force applied axially to the rod along the central axis perpendicularly away from the central axis to define a second radial force component of the closing force; and wherein the flexible member includes a first material forming a first layer and a second material forming a second layer bonded to the first layer to form a multi-layered structure.

16. A gas strut assembly as set forth in claim 15 wherein the first material includes a first coefficient of thermal expansion, and the second material includes a second coefficient of thermal expansion, wherein the second coefficient of thermal expansion is different from the first coefficient of thermal expansion such that a thermal change in the multi-layered structure of the flexible member causes the first layer and the second layer to expand or contract at different rates causing a shape of the at least one displaceable member to change in response to the thermal change in the flexible member.

17. A gas strut assembly as set forth in claim 16 wherein the change in shape of the displaceable member in response to the thermal change of the flexible member changes a point of contact between the first cam surface and the displaceable member, and changes a point of contact between the second cam surface and the displaceable member.

18. A gas strut assembly as set forth in claim 17 wherein the change in shape of the displaceable member in response to the thermal change of the flexible member changes at least one of the first engagement angle and the second engagement angle.

19. A gas strut assembly as set forth in claim 15 further comprising a band disposed radially about and encircling the plurality of displaceable members.

* * * * *